July 25, 1950   J. W. WOOLLEY   2,516,738
HEATING APPARATUS FOR STEAM RAISING
AND LIKE PURPOSES Filed Sept. 10, 1947   2 Sheets-Sheet 1

Inventor
J. W. Woolley
By Haseltine Downing
Attys

July 25, 1950  J. W. WOOLLEY  2,516,738
HEATING APPARATUS FOR STEAM RAISING
AND LIKE PURPOSES
Filed Sept. 10, 1947  2 Sheets-Sheet 2

Inventor
J. W. Woolley
By Jasent Downing Rubell
Attys

Patented July 25, 1950

2,516,738

UNITED STATES PATENT OFFICE 2,516,738

HEATING APPARATUS FOR STEAM RAISING AND LIKE PURPOSES

John William Woolley, Tamworth, England

Application September 10, 1947, Serial No. 773,089
In Great Britain September 26, 1946

1 Claim. (Cl. 219—38)

This invention relates to heating apparatus for liquid media, such as for steam raising, and like purposes, and has for its primary object to provide an improved and simplified apparatus capable of supplying heated media such as steam irrespective of the continuity of the supply of heating power.

Another object is to provide an improved and simplified apparatus whereby a source of heating power of limited thermal capacity per unit of time may store up that power over a period and give it out over a shorter period but at a desired greater thermal output per unit of time.

A further object is to provide a heating apparatus embodying the above advantages which is particularly adapted for the supply of steam for sterilizing and other industrial purposes where steam is not required continuously throughout the 24 hours of the day. Thus the invention may be applied with particular advantage to the production of steam for sterilizing in dairies and ice cream parlours for example, or for process work in the treatment of wood, artificial silk, leather, cloth, felt and other materials, or for the heating of water by steam injection, or for any other purpose where steam is intermittently required.

According to the invention, a heating apparatus for the purposes described comprises a block of metal supported within an enclosed casing spaced from the block, means for supplying heat to the interior of the block, and means for circulating the medium to be heated through the enclosing casing, the block being of a size and shape to store heat supplied thereto and to supply such stored heat evenly to the circulating medium. According to a further feature of the invention there is a small clearance between the sides and bottom of the metal block and its surrounding casing and a larger clearance at the top, the casing being surrounded with heat insulating material preferably enclosed in an outer container.

According to a further feature of the invention the metal heat storage block is of generally rectangular shape, the top and bottom being preferably of shallow wedge form.

The invention also consists in a heating apparatus as set forth in the preceding paragraph arranged as a steam generator, means being provided for feeding water to the heat storage block, preferably to the underside thereof, at a controlled rate to give a constant steam output.

In some circumstances it may be desirable to include an automatic storage water heater in the feed line to increase the evaporative capacity of the heat storage block. This heater may be of a conventional type.

Figure 1:
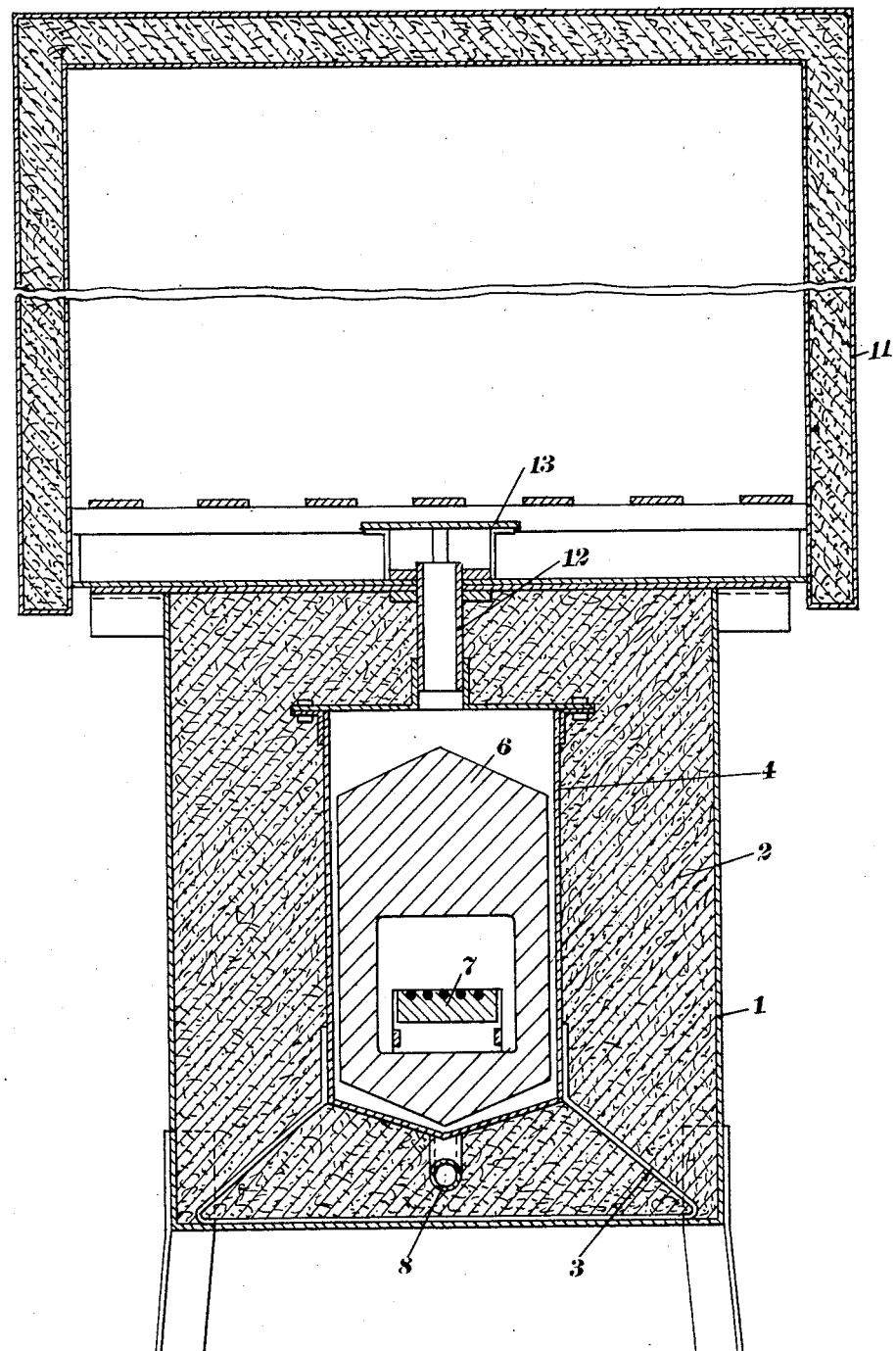
Figure 1 is an end elevation, in section, of a steam sterilizing heater constructed and arranged in accordance with the invention.
Figure 2:
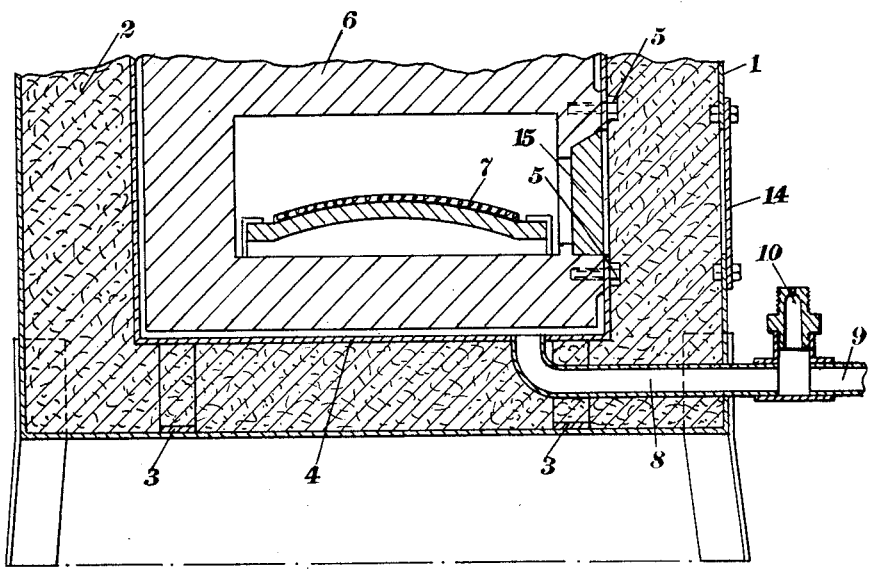
Figure 2 is a side elevation of a part of the heater showing the arrangement of the electric heating element and the water feed.

In carrying the invention into effect as applied by way of example to a steam sterilizing apparatus for dairies and similar purposes, there is provided an outer metal casing 1 supported on short legs and containing heat insulating material 2. Supported within the casing 1 upon bent strips 3 is a rectangular steam generator casing 4 within which is supported, by means of bolts 5, a metal block 6 of generally rectangular shape with top and bottom portions of shallow wedge shape and an interior recess having an opening at the supported end. The casing 4 is shaped so that there is a small clearance all round the block and a larger clearance at the upper end thereof. An electrical heating element 7 of the conventional one kilowatt electric fire type is supported within the recess. A water feed pipe 8 is connected to the lower part of the casing 4 as shown and has a branch 9 leading to a drain tap (not shown). Immediately above the point where the branch 9 leads to the drain tap is a union containing a maximum flow valve 10 the purpose of which is to keep the rate of steam production in the generator within safe limits. When fixing this limit the size of the hole in the valve is related to the head of water in the feed tank.

An insulated or plain sterilizing chamber 11 is mounted on the top of the casing 1 and steam is led from the upper part of the generator casing 4 by means of a short length of pipe 12 to the sterilizing chamber or, if this pipe is fitted with a two-way valve (not shown), to positions for alternative uses outside the sterilizing chamber. A baffle plate 13 is provided to distribute the issuing steam. A cover 14 bolted to one end of the casing 1 and a wedge shaped block of heat insulating material 15 designed to exclude free air from the electrical heating element 7 and having an aperture (not shown) through which pass the electrical connections to the heating element 7, can both be removed to give access to the heating element.

Any suitable means for giving a controlled feed of water to the heated block may be employed, but preferably a small feed tank is mounted on the sterilizing chamber and is fed either by hand or by a conventional ball valve. A manual control valve is provided between the tank and the maximum flow valve 10. A filter for removing sediment or other matter which might tend to block the maximum flow valve 10 may also be included. These arrangements are conventional and have not been shown in the drawing.

The electrical heating element is preferably controlled by a conventional time switch having either a fourteen day or a twenty-eight day movement, which may be mounted on the apparatus if desired, but in cases where the frequency of an alternating current electric supply can be relied upon for giving correct time, then a synchronous electric time switch would be preferable to the hand-wound type.

The necessary control switch and fuzes for controlling the electric circuit to the time switch and other apparatus would normally be provided by the user when the plant is being installed.

In operating the apparatus as a steam sterilizer, the water feed control valve and drain tap are closed and the time switch is set to operate for a suitable period before steam is required. For instance, if a conventional electric sterilizer loaded six kilowatts requires one hour in order to give the required output of steam, the corresponding size of electric sterilizer made in accordance with this invention would need to have the heating element, if of one kilowatt as suggested in this instance, switched on by means of the time switch for a period of six hours. At the end of this period the articles to be sterilized are placed in the chamber and the water feed valve is turned on. A temperature of 210 degrees in the sterilizing chamber will be reached in about ten minutes or under, and when this temperature is reached the water feed valve is closed. After sterilizing at this temperature has continued for about ten minutes, the drain tap is opened in order to flush out from the generator casing any lime deposit and sediment which, if allowed to accumulate inside the generator casing, would ultimately affect the satisfactory operation of the apparatus. After all the water has been drained away, the drain tap is then closed in order to prevent cold air being drawn by convection through the generator casing and wasting heat from the block. The apparatus is now ready for a further cycle of operations.

Because heat is readily stored within the insulated block, it is not essential to operate the apparatus immediately following the primary heating period. A period of some hours may elapse without serious loss of heat.

If desired, an automatic storage water heater of a conventional type may be included in the feed circuit so that hot water is supplied to the steam generating casing, thereby increasing the evaporative capacity of the heat storage block for a given quantity of heat stored therein.

It will be seen that the invention provides a simple and reliable form of heating apparatus which may be employed for steam raising, and other purposes and which does not require a continuous supply of power for heating, thus enabling power to be taken at off-peak periods for example or enabling heating to be continued during periods when the power supply is cut off.

Because of its low electrical loading and of its heat storage capabilities, the invention is also useful in those cases where the electrical distribution system supplying any given consumer is so fully loaded that the connection of further potential peak load has had to be refused by the electric supply authority.

There are other instances where owners of small, say one kilowatt, private generating plants may require say a four-kilowatt heating output for only ten or fifteen minutes per day. The invention would enable such a person to attain this object with his existing generating plant.

By reason of the heat storage capacity provided by the invention, a given heating operation may be carried out in a relatively short time as compared with the usual types of heating plant. This is of particular importance in sterilizing and similar applications, and a further advantage is that super-heated steam for sterilizing purposes may be quickly provided.

Having thus described my invention what I claim as new and desire to secure by Letters Patent is:

Heating apparatus for liquid media, comprising in combination a casing having an inlet at its lower end and an outlet at its upper end, a metal heat storage block mounted in the casing so as to leave between the sides, tops and bottoms of the block and casing, clearances through which liquid media to be heated by contact with the block can flow from the inlet to the outlet, and means for supplying heat to the interior of the block, the upper and lower ends of the block being of shallow wedge shape, and the clearance between the tops of the block and casing being larger than the clearances between the sides and bottoms of the block and casing.

JOHN WILLIAM WOOLLEY.

REFERENCES CITED

The following references are of record in the file of this patent:

UNITED STATES PATENTS

| Number | Name | Date |
|---|---|---|
| 854,318 | Wantz | May 21, 1907 |
| 1,069,374 | Bell et al. | Aug. 5, 1913 |
| 1,069,949 | Hassler | Aug. 12, 1913 |
| 1,607,393 | Derby | Nov. 16, 1926 |
| 1,875,236 | Hall | Aug. 30, 1932 |
| 2,066,127 | Slayter | Dec. 29, 1936 |
| 2,266,257 | Osterheld | Dec. 16, 1941 |